United States Patent [19]

Gadberry et al.

[11] Patent Number: 5,663,111
[45] Date of Patent: Sep. 2, 1997

[54] ORGANOCLAY COMPOSITIONS

[75] Inventors: James F. Gadberry, Danbury, Conn.; Michael Hoey, Woodbridge, N.J.; Clois E. Powell, Seguin, Tex.

[73] Assignees: Southern Clay Products, Inc., Gonzales, Tex.; Akzo Nobel Inc., Dobbs Ferry, N.Y.

[21] Appl. No.: 524,898

[22] Filed: Sep. 7, 1995

[51] Int. Cl.$^6$ .................................................. C09C 1/42
[52] U.S. Cl. .................... 501/146; 252/315.2; 106/468
[58] Field of Search .................... 501/146; 252/315.2; 106/468

[56] References Cited

U.S. PATENT DOCUMENTS

| | | |
|---|---|---|
| 3,123,641 | 3/1964 | Longley . |
| 3,252,757 | 5/1966 | Granquist . |
| 3,586,478 | 6/1971 | Neumann . |
| 3,654,370 | 4/1972 | Yeakey . |
| 3,666,407 | 5/1972 | Orlemann . |
| 3,671,190 | 6/1972 | Neumann et al. . |
| 3,844,978 | 10/1974 | Hickson . |
| 3,844,979 | 10/1974 | Hickson . |
| 3,852,405 | 12/1974 | Granquist . |
| 3,855,147 | 12/1974 | Granquist . |
| 4,144,122 | 3/1979 | Emanuelsson et al. . |
| 4,432,833 | 2/1984 | Breese . |
| 4,677,158 | 6/1987 | Tso et al. . |
| 4,695,402 | 9/1987 | Finlayson et al. . |
| 4,739,094 | 4/1988 | Mazanek et al. . |
| 4,866,018 | 9/1989 | Elliot .......................... 501/146 |
| 4,874,728 | 10/1989 | Eilliott et al. ............... 501/146 |
| 4,960,942 | 10/1990 | Gerkin et al. . |
| 4,967,005 | 10/1990 | Smith . |
| 5,151,155 | 9/1992 | Cody et al. . |
| 5,296,627 | 3/1994 | Tang et al. . |
| 5,336,647 | 8/1994 | Nae et al. .................... 501/146 |
| 5,344,984 | 9/1994 | Knifton et al. . |
| 5,347,051 | 9/1994 | Sheehan et al. . |
| 5,376,604 | 12/1994 | Iwasaki et al. . |
| 5,429,999 | 7/1995 | Nae et al. . |

*Primary Examiner*—David Brunsman
*Attorney, Agent, or Firm*—Klauber & Jackson

[57] ABSTRACT

Organoclay compositions which comprise the reaction product of a smectite-type clay having an ion exchange capacity of at least 50 meq. wt. per 100 g. clay (active basis), and an alkoxylated quaternary ammonium compound having one or two alkoxylated chains containing 0–10 moles ethylene oxide and 3–15 moles of propylene or butylene oxide residues are useful thixotropic materials, especially for the preparation of aqueous systems.

16 Claims, No Drawings

ORGANOCLAY COMPOSITIONS

BACKGROUND OF THE INVENTION

This invention relates generally to organoclays, and, more specifically, to improved organoclays which are produced by the reaction of the organoclay with an alkoxylated quaternary ammonium compound.

Organoclays, representing the reaction product of a smectite-type day with a quaternary ammonium compound, have long been known for use in gelling of organic liquids such as lubricating oils, linseed oil, toluene and the like. A large variety of highly useful products, such as lubricating greases, are producible through use of such gelling agents. The procedures and chemical reactions pursuant to which these organoclays are prepared, are well-known. Thus, under appropriate conditions, the organic compound which contains a cation, will react by ion exchange with the clay which contains a negative layer lattice and exchangeable cations to form the organoclay products.

Other uses for such modified organoclays are those such as are disclosed in U.S. Pat. No. 5, 151,155, wherein organically modified smectite clays are utilized in a process for deinking wastepaper, and in U.S. Pat. No. 4,677,158, wherein smectite-type clays which have been reacted with quaternary ammonium compounds are utilized as thickeners for aqueous suspensions, particularly latex paints and caulks. These modified organoclays differ from those of the present invention in the type of quaternary ammonium compound with which they are reacted. This modification produces organoclays with markedly superior properties than those of the prior art.

OBJECTS OF THE INVENTION

It is an object of the present invention to prepare organoclay compositions having improved rheological properties, and thus useful as thixotropes in aqueous compositions.

It is further an object of the present invention to prepare improved aqueous compositions, especially paint formulations, which possess improved properties by virtue of their inclusion of the organoclay compositions of the present invention.

SUMMARY OF THE INVENTION

In accordance with the present invention, it has unexpectedly been discovered that the reaction of smectite-type clays with certain alkoxylated quaternary ammonium compounds can produce organoclay products having superior properties when utilized as water-based thixotropes.

Thus, the present invention is concerned with an organoclay composition comprising the reaction product of a smectite-type clay having an ion exchange capacity of at least 50 meq. wt. per 100 g. clay (active basis), and an alkoxylated quaternary ammonium compound having the following formula:

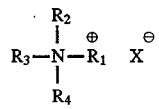
(I)

wherein $R_1$ and $R_2$ are alike or different, and are selected from the group consisting of $C_1-C_8$ alkyl, benzyl or 2-hydroxyethyl groups; $R_3$ is a $C_1-C_8$ alkyl, benzyl or 2-hydroxyethyl group, or an alkoxylated chain containing 0-10 moles ethylene oxide and 3-15 moles of an alkylene oxide residue selected from the group consisting of propylene oxide, butylene oxide, and mixtures thereof; and $R_4$ is an alkoxylated chain containing 0-10 moles ethylene oxide and 3-15 moles of an alkylene oxide residue selected from the group consisting of propylene oxide, butylene oxide, and mixtures thereof; and X is the salt anion.

DESCRIPTION OF PREFERRED EMBODIMENTS

The smectite clays which are utilized as one of the starting materials of the present invention are those which have been conventionally utilized in the prior art. Suitable smectite-type clays are those which have a cation exchange capacity of at least 50 milliequivalents (meq.) weight (wt.) per 100 grams of clay (active basis). Useful clays for such purposes include the naturally occurring Wyoming variety of swelling bentonite and similar clays, and hectorite, which is a swelling magnesium-lithium silicate clay. The clays are preferably converted to the sodium form if they are not already in this form. This can be effected, again as in known in the art, by a cation exchange reaction, or the clay can be converted via an aqueous reaction with a soluble sodium compound.

Smectite-type clays prepared synthetically can also be utilized, such as montmorillonite, bentonite, beidelite, hectoritesaponite, and stevensite. Such clays, and processes for their preparation, are described in U.S. Pat. Nos. 4,695,402, 3,855,147, 3,852,405, 3,844,979, 3,844,978, 3,671,190, 3,666,407, 3,586,478, and 3,252,757, all of which are herein incorporated by reference.

The alkoxylated quaternary ammonium salts which are reacted with the smectite-type clay are of the formula

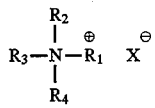
(I)

wherein $R_1$ and $R_2$ are alike or different, and are selected from the group consisting of $C_1-C_8$ alkyl, benzyl or 2-hydroxyethyl groups; $R_3$ is a alkyl, benzyl or 2-hydroxyethyl group, or an alkoxylated chain containing 0-10 moles ethylene oxide and 3-15 moles an alkylene oxide residue selected from the group consisting of propylene oxide, butylene oxide and mixtures thereof; and $R_4$ is an alkoxylated chain containing 0-10 moles ethylene oxide and 3-15 moles of an alkylene oxide residue selected from the group consisting of propylene oxide, butylene oxide and mixtures thereof; and X is the salt anion.

The salt anion X is methosulfate, ethosulfate, methylcarbonate, ethylcarbonate, chloride, bromide, or mixtures thereof, and is most preferably a methosulfate ion. The salt anion may also, however, be nitrate, hydroxide, acetate, or mixtures of these.

The alkoxylated chains present in the alkoxylated quaternary ammonium compounds of the present invention determine the particularly advantageous properties of the resultant organoclays of the present invention. Thus, the prior art organoclays which contain saturated alkyl groups in the quaternary ammonium compound provide modified organoclays which are too hydrophobic to be useful in aqueous systems. Likewise, the use of the prior art polyethoxylated chain quaternary ammonium compounds provide modified organoclays which are too hydrophilic and which provide organoclays which are difficult to de-water during processing steps. It is thus critical to the present invention to provide quaternary ammonium compounds which, upon reaction with the smectite-type clay, will afford an organoclay composition having the desired hydrophobic/hydrophilic balance, resulting in desirable properties in the end-products.

Preferred embodiments of the present invention will utilize quaternary ammonium compounds having one or two alkoxylated chains each containing 1–5 moles ethylene oxide and 4–10 moles propylene oxide and/or butylene oxide residues.

Highly preferred embodiments of the present invention are organoclays which comprise the reaction product of smectite-type clays with alkoxylated quaternary ammonium compounds wherein the $R_3$ and $R_4$ chains each contain the residue of 5 moles ethylene oxide and 5 moles propylene oxide, and are thus represented by the following formula:

$$(CH_3)_2N[(CH_2CH_2O)_x(CH_2CH(CH_3)O_y]_2H$$

wherein x and y=5 or wherein $R_3$ and $R_4$ each contain the residue of 1 mole of ethylene oxide and 4 moles of propylene oxide, represented by the formula:

$$(CH_3)_2N[(CH_2CH_2O)_x(CH_2CH(CH_3)(O)_y]_2H$$

wherein x and y=4 or wherein $R_3$ and $R_4$ each contain the residue of 1 mole ethylene oxide and 5 moles each of propylene oxide and butylene oxide, represented by the formula:

$$(CH_3)_2N[(CH_2CH_2O)_x(CH_2CH(CH_3)O)_y(CH_2CH(CH_2CH_3)O)_z]_2H$$

wherein x=1, y=5 and z=2

Other preferred embodiments of the invention involve the reaction product of a smectite-type clay with an alkoxylated quaternary ammonium compound wherein $R_1$, $R_2$ and $R_3$ are each a methyl group and $R_4$ is an alkoxylated chain containing 1 mole ethylene oxide and 9 moles propylene oxide represented by the formula:

$$(CH_3)_3N[(CH_2CH_2O)_x(CH_2CH(CH_3)O)_y]H$$

wherein x=1 and y=9 or when $R_4$ is an alkoxylated chain containing 1 mole ethylene oxide, 5 moles propylene oxide and 5 moles of butylene oxide represented by the formula:

$$(CH_3)_3N[(CH_2CH_2O)_x(CH_2CH(CH_3)O)_y(CH_2CH(CH_2CH_3)O)_z]H$$

wherein x=1, y=5 and z=5.

x, y and z when employed herein denote relative reactive molar ratios and the reaction products generally represent a product distribution centered around these ratios.

Other quaternary ammonium salts which are particularly useful in the present invention are described in the U.S. Pat. Nos. 3,123,641, 4,144,122, 4,432,833 and 5,296,627, which are incorporated herein by reference.

The alkoxylated quaternary ammonium compounds useful in the present invention of the present invention can be prepared by various methods known by those of ordinary skill in the art. In a preferred method, the quaternary ammonium compound is prepared by the reaction of a tertiary amine and an alkylating agent. Some alkylating agents, well known to those practicing the art, include organic halides such as methyl chloride, diorganosulfates such as dimethyl sulfate, or diorgano carbonates, such as dimethyl carbonate. This method of preparation is described in ENCYCLOPEDIA OF CHEMICAL TECHNOLOGY edited by Kirk/Othmer (Third Edition, Vol 19, page 521–531) which is incorporated herein by reference.

The tertiary amine, useful in preparing the quaternary ammonium salt, is preferably a polyalkoxylated amine produced by reacting ammonia, a primary amine, or a secondary amine with an alkoxylating agent. Suitable alkoxylating agents include alkyl epoxides such as ethylene oxide, propylene oxide, and butylene oxide. Tertiary polyalkoxylated amines which can also be employed in the present invention are prepared by reacting ammonia, a primary amine, or a secondary amine with a polyalkoxylated alcohol or polyalkoxylated glycol. Especially useful tertiary amines may also be made by alkylating a primary, or secondary alkoxylated amine, such as the available JEFFAMINE® series of alkoxylated amines available from Huntsman Chemicals (JEFFAMINE® is a registered mark of Huntsman Chemicals Inc.) or the available TECTRONIC® series of alkoxylated amines available form BASF Corporation (TECTRONIC® is a registered trademark of BASF Corporation). Examples of other tertiary amines useful in the present invention can be found in U.S. Pat. Nos. 3,654,370, 4,739,094, 4,960,942, 4,967,005, 5,344,984 and 5,347,051, which are incorporated herein by reference.

The amount of the alkoxylated quaternary ammonium compound reacted with the smectite-type clay depends upon the specific clay and the desired degree of hydrophobicity. Typically, the amount of cation ranges from about 0.1 to about 150%, preferably from about 100 to about 130% of the cation exchange capacity of the clay. Thus, for example, when bentonite is used, the amount of cation reacted with the clay will range from about 85 to about 143 milliequivalents, preferably from about 95 to about 124 milliequivalents per 100 grams of clay, 100% active basis.

A further embodiment of the present invention is the process for preparing the organoclay composition comprising the reaction product of a smectite-type clay having an ion exchange capacity of at least 50 meq. wt. per 100 g. clay (active basis), and an alkoxylated quaternary ammonium compound of the formula:

$$R_3-\overset{\overset{\displaystyle R_2}{|}}{\underset{\underset{\displaystyle R_4}{|}}{N}}{}^{\oplus}-R_1 \quad X^{\ominus} \quad\quad (I)$$

wherein $R_1$ and $R_2$ are alike or different, and are selected from the group consisting of $C_1$–$C_8$ alkyl, benzyl or 2-hydroxyethyl groups; $R_3$ is a $C_1$–$C_8$ alkyl, benzyl or 2-hydroxyethyl group, or an alkoxylated chain containing 0–10 moles ethylene oxide and 3–15 moles an alkylene oxide residue selected from the group consisting of propylene oxide, butylene oxide and mixtures thereof; and $R_4$ is an alkoxylated chain containing 0–10 moles ethylene oxide and 3–15 moles of an alkylene oxide residue selected from the group consisting of propylene oxide, butylene oxide and mixtures thereof; and X is the salt anion; which comprises:

a) dispersing a smectite type clay having an ion exchange capacity of at least 50 meq. wt. per 100 g. clay in an aqueous media;

b) heating the dispersing of step (a) to a temperature in excess of 30° C.;

c) adding the heated dispersion of step (b) of a quaternary ammonium salt of the formula

wherein $R_1$ and $R_2$ are alike or different, and are selected from the group consisting of $C_1$–$C_8$ alkyl, benzyl or 2-hydroxyethyl groups; $R_3$ is a $C_1$–$C_8$ alkyl, benzyl or 2-hydroxyethyl group, or an alkoxylated chain containing 0–10 moles ethylene oxide and 3–15 moles an alkylene oxide residue selected from the group consisting of propylene oxide, butylene oxide and mixtures thereof; and $R_4$ is an alkoxylated chain containing 0–10 moles ethylene oxide and 3–15 moles of an alkylene oxide residue selected from the group consisting of propylene oxide, butylene oxide and mixtures thereof; and X is the salt anion, in the desired milliequivalent ratio; and d) agitating the mixture of step (c) to effect completion of the reaction.

The organoclay composition of the present invention is thus prepared by admixing an aqueous dispersion of the smectite-type clay, warmed to a temperature in excess of 30° C., with an alkoxylated quaternary ammonium compound of formula I to exchange the metal counterions that are naturally present in the smectite-type clay. The reaction is typically conducted at a temperature within the range of from about 40° C. to about 100° C. for a period of time sufficient for the alkoxylated quaternary ammonium compound to react with the clay particles.

Preferably, the clay is dispersed in the water at a concentration from about 3% to about 15% by weight and the slurry is centrifuged to remove non-clay impurities. The slurry is then agitated and heated to the desired temperature, and the quaternary ammonium salt added in the desired milliequivalent ratio. The alkoxylated quaternary ammonium compounds are typically liquids, but they can be dispersed in water to facilitate the reaction. Agitation is continued to effect completion of the reaction.

The mount of the alkoxylated quaternary ammonium compound added to the smectite-type clay for the purposes of this invention must be sufficient to impart to the clay the enhanced characteristics desired. The milliequivalent ratio is defined as the number of milliequivalents of the alkoxylated quaternary ammonium compound, per 100 grams of clay, 100% active basis. The typical smectite-type days of this invention have a milliequivalent ratio of from about 10 to about 150. The preferred milliequivalent ratio will vary depending on the characteristics of the particular alkoxylated quaternary ammonium compound utilized and the end use for the resultant product.

When the organoclay composition of the present invention is utilized for its rheological properties for application as to control sagging of fluid films and prevent settling and hard packing of pigments present in paint compositions, particularly latex paint compositions, it is typically employed in an amount of about 5 lb. to about 95 lb./100 gallons paint composition.

The present invention thus contemplates the preparation of latex paint formulations having improved properties which comprise the addition of the improved organoclay composition which is the reaction product of a smectite-type clay having an ion exchange capacity of at least 50 meq. wt. per 100 g. clay and an alkoxylated quaternary ammonium compound of the general formula I. Typically, the latex paint formulation will contain the improved organoclay composition is an amount of about 2 to about 10% by weight of the finished latex paint formulation. Preferred formulations contain the organoclay thixotrope in an amount of about 3 to about 6% by weight of the finished latex paint formulation.

Latex paint formulations containing the organoclay composition of the instant invention exhibit superior characteristics when brush out, roll out and spray out applications were compared with standard commercially available latex paint formulations. The latex paints formulated using the organoclay compositions exhibited a high low-shear viscosity and a low high-shear viscosity in contrast to the commercial paints which exhibited lower low-shear values and higher high-shear values. When sheared, theses latex paint formulations thinned out to a flowable and workable viscosity. The low high-shear viscosity of the these latex paints results in excellent atomization in airless spray application. In addition, the presence of the organoclay in the latex paint formulations improved the sag characteristics of these paints to such a degree that sprayouts of thirty mils or higher were common.

The invention will now be illustrated by a series of Examples, which are intended to set forth typical and preferred procedures to be utilized in the practice of the invention.

EXAMPLE 1

The preparation of a smectite-type clay composition comprising the reaction product of a smectite-type clay and a quaternary ammonium compound of the formula I wherein the $R_1$ and $R_2$ are each a methyl group and the $R_3$ and $R_4$ chains each contain the residue of 5 moles ethylene oxide and 5 moles propylene oxide is prepared as follows:

5000 Grams of an aqueous three pass slurry of montmorillonite SCPX 818 containing 3.72 % solids in a 5 gallon tank is heated on a lightening mixer to 60° C. (140° F.). To this heated slurry is then added 87.19 grams of the alkoxylated quaternary ammonium compound of formula I wherein the $R_1$ and $R_2$ are each a methyl group and the $R_3$ and $R_4$ chains each contain the residue of 5 moles ethylene oxide and 5 moles propylene oxide (AKR 94005 Lot #94016RS-T) at 30 MER, which mixture is then stirred for fifteen minutes until the clay swells and mixing is no longer possible. After transfer to a quart jar, no separation was observed after twenty-four hours, indicating completion of the reaction.

This was calculated 5.03% solids 255.89 grams dry clay

EXAMPLE 2

The preparation of a smectite-type clay composition comprising the reaction product of a smectite-type clay and a quaternary ammonium compound of the formula I wherein the $R_1$ and $R_2$ are each a methyl group and the $R_3$ and $R_4$ chains each contain the residue of 1 mole ethylene oxide and 5 moles propylene oxide is prepared as follows:

5000 Grams of an aqueous three pass slurry of montmorillonite SCPX 818 containing 3.72% solids in a 5 gallon tank is heated on a lightening mixer to 60° C. (140° F.). To this heated slurry is then added 43.6 grams of the alkoxylated quaternary ammonium of formula I wherein the $R_1$ and $R_2$ are each a methyl group and the $R_3$ and $R_4$ chains each contain the residue of 1 mole ethylene oxide and 5 moles propylene oxide (ARK 94006 Lot #94016RS-T) at 20 MER, which mixture is then stirred for fifteen minutes until the clay swells and mixing is no longer possible. After transfer to a quart jar, no separation was observed after twenty-four hours, indicating completion of the reaction.

This was calculated 4.38% solids 220.91 grams dry clay

EXAMPLE 3

A latex paint formulation consisting of:

| Volume | Material | Weight |
| --- | --- | --- |
| 5.85 | SM/OC CEP/HRD Thixotrope prepared as in Example 1 | 49.70 |
| 14.42 | Water | 120.30 |
| 0.09 | Troysan 142-Bacteriostat | 1.00 |
| 0.65 | Tamol 731 | 6.00 |
| 0.05 | Potassium Tripolyphosphte | 1.00 |
| 0.34 | Triton N-101 | 3.00 |
| 0.13 | AMP-95 | 1.00 |
| 2.55 | Propylene Glycol | 22.00 |
| 0.27 | Bubble Breaker 748 | 2.00 |

Procedure for preparation: Add together the following and mix:

| | | |
| --- | --- | --- |
| 5.09 | TiO2 CR-800 | 175.00 |
| 4.42 | No. 1 White | 100.00 |
| 3.56 | Snowflake White | 80.00 |
| 7.99 | ECCA Tex 90 | 175.00 |
| | Disperse to 5 + Hegman 3400 RPM, 15 m. Dispermat | |
| 16.61 | Water | 138.50 |
| 0.27 | Bubble Breaker 748 | 2.00 |
| 5.85 | SM/OC CEP/HRD Thixotrope prepared as in Example 1 | 49.70 |
| 1.14 | Texanol | 9.00 |

Then, mix and add:

| | | |
| --- | --- | --- |
| 31.27 | UCAR 376 Latex | 283.00 |

Check the following specs:

| | |
| --- | --- |
| Viscosity, KU | 95 |
| ICI, Poise | 0.8 |
| BF 1 | 66,800 |
| 10 | 10,520 |
| 100 | 1,904 |
| Leneta Sag | 12 |
| Leneta Leveling | 3 |
| Final pH | 8.16 |
| Weight/Gallon | 11.95 |
| Syneresis 120/10D | 1–2% |
| Syneresis Ambient | — |

EXAMPLE 4

A latex paint formulation consisting of:

| Volume | Material | Weight |
| --- | --- | --- |
| 8.19 | SM/OC CEP/HRD Thixotrope prepared as in Example 1 | 69.58 |
| 12.04 | Water | 100.42 |
| 0.09 | Troysan 142-Bacteriostat | 1.00 |
| 0.65 | Tamol 731 | 6.00 |
| 0.05 | Potassium Tripolyphosphte | 1.00 |
| 0.34 | Triton N-101 | 3.00 |
| 0.13 | AMP-95 | 1.00 |
| 2.55 | Propylene Glycol | 22.00 |
| 0.27 | Bubble Breaker 748 | 2.00 |

Procedure for preparation: Add together and mix the following:

| | | |
| --- | --- | --- |
| 5.09 | TiO2 CR-800 | 175.00 |
| 4.42 | No. 1 White | 100.00 |
| 3.56 | Snowflake White | 80.00 |
| 7.99 | ECCA Tex 90 | 175.00 |
| | Disperse to 5 + Hegman 3400 RPM, 15 m. Dispermat | |
| 14.22 | Water | 118.62 |
| 0.27 | Bubble Breaker 748 | 2.00 |
| 8.19 | SM/OC CEP/HRD Thixotrope prepared as in Example 1 | 69.58 |
| 1.14 | Texanol | 9.00 |

Then, mix and add:

| | | |
| --- | --- | --- |
| 31.27 | UCAR 376 Latex | 283.00 |

Check the following specs:

| | |
| --- | --- |
| Viscosity, KU | 126 |
| ICI, Poise | 1.0 |
| BF 1 | 82,000 |
| 10 | 28,100 |
| 100 | 5,710 |
| Leneta Sag | 724 |
| Leneta Leveling | 1 |
| Final pH | 8.14 |
| Weight/Gallon | 11.96 |
| Syneresis 120/10D | 1–2% |
| Syneresis Ambient | — |

EXAMPLE 5

A latex paint formulation consisting of:

| Volume | Material | Weight |
| --- | --- | --- |
| 5.40 | SM/OC CEP/HRD Thixotrope prepared as in Ex. 2 | 45.66 |
| 14.91 | Water | 124.34 |
| 0.09 | Troysan 142-Bacteriostat | 1.00 |
| 0.65 | Tamol 731 | 6.00 |
| 0.05 | Potassium Tripolyphosphte | 1.00 |
| 0.34 | Triton N-101 | 3.00 |
| 0.13 | AMP-95 | 1.00 |
| 2.55 | Propylene Glycol | 22.00 |
| 0.27 | Bubble Breaker 748 | 2.00 |

Procedure for preparation: Add the following ingredients together and mix:

| | | |
| --- | --- | --- |
| 5.09 | TiO2 CR-800 | 175.00 |
| 4.42 | No. 1 White | 100.00 |
| 3.56 | Snowflake White | 80.00 |
| 7.99 | ECCA Tex 90 | 175.00 |
| | Disperse to 5 + Hegman 3400 RPM, 15 m. Dispermat | |
| 17.09 | Water | 142.54 |
| 0.27 | Bubble Breaker 748 | 2.00 |
| 5.40 | SM/OC CEP4M Thixotrope prepared as in Ex. 2 | 45.66 |
| 1.14 | Texanol | 9.00 |

Then, mix and add:

| | | |
| --- | --- | --- |
| 1.27 | UCAR 376 Latex | 283.00 |

Check the following specs:

| | |
| --- | --- |
| Viscosity, KU | 94 |
| ICI, Poise | 0.8 |
| BF 1 | 68,800 |
| 10 | 11,560 |
| 100 | 2,028 |
| Leneta Sag | 12 |
| Leneta Leveling | 3–4 |
| Final pH | 8.19 |
| Weight/Gallon | 11.96 |
| Syneresis 120/10D | 1–2% |
| Syneresis Ambient | — |

EXAMPLE 6

A latex paint formulation consisting of the following:

| Volume | Material | Weight |
|---|---|---|
| 8.11 | SM/OC CEP/HRD Thixotrope prepared in Ex. 2 | 68.49 |
| 12.17 | Water | 101.51 |
| 0.09 | Troysan 142-Bacteriostat | 1.00 |
| 0.65 | Tamol 731 | 6.00 |
| 0.05 | Potassium Tripolyphosphte | 1.00 |
| 0.34 | Triton N-101 | 3.00 |
| 0.13 | AMP-95 | 1.00 |
| 2.55 | Propylene Glycol | 22.00 |
| 0.27 | Bubble Breaker 748 | 2.00 |

Procedure for preparation: Add the following together and mix:

| Volume | Material | Weight |
|---|---|---|
| 5.09 | TIO2 CR-800 | 175.00 |
| 4.42 | No. 1 White | 100.00 |
| 3.56 | Snowflake White | 80.00 |
| 7.99 | ECCA Tex 90 | 175.00 |
| | Disperse to 5 + Hegman 3400 RPM, 15 m. Dispermat | |
| 14.35 | Water | 119.71 |
| 0.27 | Bubble Breaker 748 | 2.00 |
| 8.11 | SM/OC CEP/HRD Thixotrope prepared in Ex. 2 | 68.49 |
| 1.14 | Texanol | 9.00 |

Then, mix and add:

| Volume | Material | Weight |
|---|---|---|
| 31.27 | UCAR 376 Latex | 283.00 |

Check the following specs:

| | |
|---|---|
| Viscosity, KU | 102 |
| ICI, Poise | 0.9 |
| BF 1 | 72,400 |
| 10 | 16,400 |
| 100 | 3,076 |
| Leneta Sag | 16 |
| Leneta Leveling | 2 |
| Final pH | 8.17 |
| Weight/Gallon | 11.95 |
| Syneresis 120/10D | 1–2% |
| Syneresis Ambient | — |

EXAMPLE 7

A latex paint formulation consisting off

| Volume | Material | Weight |
|---|---|---|
| 20.00 | SM/OC CEP/HRD Thixotrope prepared as in Example 2 | 170.00 |
| 0.09 | Troysan 142-Bacteriostat | 1.00 |
| 0.65 | Tamol 731 | 6.00 |
| 0.05 | Potassium Tripolyphosphte | 1.00 |
| 0.23 | Triton N-101 | 2.00 |
| 0.13 | AMP-95 | 1.00 |
| 2.55 | Propylene Glycol | 22.00 |
| 0.27 | Bubble Breaker 748 | 2.00 |

Procedure for preparation: Add together the following and mix:

| Volume | Material | Weight |
|---|---|---|
| 5.47 | TIO2 CR-813 | 175.00 |
| 4.42 | No. 1 White | 100.00 |
| 7.99 | Satintone white | 17500 |
| 3.46 | Minex 7 | 75.00 |
| | Disperse to 5 + Hegman 3400 RPM, 15 m. Dispermat | |
| 1.73 | Water | 14.40 |
| 0.27 | Bubble Breaker 748 | 2.00 |
| 20.00 | SM/OC CEP/HRD Thixotrope prepared as in Ex. 2 | 170.00 |
| 1.14 | Texanol | 9.00 |

Then, mix and add:

| Volume | Material | Weight |
|---|---|---|
| 31.27 | UCAR 376 Latex | 283.00 |

EXAMPLE 8

A latex paint formulation consisting of:

| Volume | Material | Weight |
|---|---|---|
| 40.00 | SM/OC CEP/HRD Thixotrope prepared as in Example 2 Thixotrope load adjusted on a dry solids basis (Thix. + water = 170.0 grams) | 340.00 |
| 0.09 | Troysan 142-Bacteriostat | 1.00 |
| 0.65 | Tamol 731 | 6.00 |
| 0.05 | Potassium Tripolyphosphte | 1.00 |
| 0.34 | Triton N-101 | 3.00 |
| 0.13 | AMP-95 | 1.00 |
| 2.55 | Propylene Glycol | 22.00 |
| 0.27 | Bubble Breaker 748 | 2.00 |

Procedure for preparation: Add together the following and mix:

| Volume | Material | Weight |
|---|---|---|
| 5.09 | T1O2 CR-800 | 175.00 |
| 4.42 | No. 1 White | 100.00 |
| 3.56 | Snowflake white | 80.00 |
| 7.99 | ECCA TEX 90 | 175.00 |
| | Disperse to 5 + Heginan 3400 RPM, 15 m. Dispermat | |
| 2.18 | Water | 18.20 |
| 0.27 | Bubble Breaker 748 | 2.00 |
| 1.14 | Texanol | 9.00 |

Then, mix and add:

| Volume | Material | Weight |
|---|---|---|
| 31.27 | UCAR 376 Latex | 283.00 |

EXAMPLE 9

Comparison of Paint Formulations

A. An aqueous slurry of non-exchanged montmorillonite added to paint at a rate of 6 dry lbs/100 gallons paint was found to have the following characteristics:

| Brookfield Viscosity | |
|---|---|
| 1 RPM (rotations per minute) | 94,400 cps. |
| 10 RPM | 17,880 cps. |
| 100 RPM | 2,884 cps. |
| Krebs Stormer Viscosity | 99 KU |
| ICI Cone and Plate Viscosity | 0.9 |
| Leneta Chart | |
| Sag Reading | 10 |
| Leveling Reading | 30 |
| pH | 8.55 |
| Temp. °C. | 23.6 |
| Pounds/Gallons | 11.90 weight/gallon |
| Syneresis Settling Rating | |
| 120/10D % | 1.63 |
| Scrub rating | 94/152 |
| | 106/152 |
| Brush Drag Rating | 2.5–3 |
| Brush Out Rating | Good Loading Poor Leveling |

11
-continued

| | |
|---|---|
| Roller Splatter Rating | 6 |
| Spray Out Rating | Good Atomization at 12–14 mil. |
| Roll Out Rating | 2 Splatter |
| | Fine Texture |

B. An aqueous slurry of montmorillonite exchanged with the quat ACAR 94005 (prepared as in Example 1, at 30 milliequivalence/100 grams montmorillonite) added to the same paint as A at 7 dry lbs/100 gallons paint was found to have the following characteristics:

| Brookfield Viscosity | |
|---|---|
| 1 RPM (rotations per minute) | 80,000 cps. |
| 10 RPM | 14,400 cps. |
| 100 RPM | 2,628 cps. |
| Krebs Stormer Viscosity | 97 KU |
| ICI Cone and Plate Viscosity | 0.8 |
| Leneta Chart | |
| Sag Reading | 8 |
| Leveling Reading | 4 |
| pH | 8.57 |
| Temp. °C. | 23.7 |
| Pounds/Gallons | 11.92 weight/gallon |
| Syneresis Settling Rating | |
| 120/10D % | 1.2 |
| Scrub Rating | 115/188 |
| | 148/211 |
| Brush Drag Rating | 2 |
| Brush Out Rating | Good Loading |
| | Poor Leveling |
| Roller Splatter Rating | 6–7 |
| Spray Out Rating | Good Atomization at 20 mils. |
| Roll Out Rating | 5 Splatter |
| | Med Texture |

C. An aqueous slurry of montmorillonite exchanged with the quat ACAR 94006 (prepared as in Example 2 at 20 milliequivalence/100 grams montmorillonite added to the same paint as A at 6 dry lbs/100 gallons paint was found to have the following characteristics:

| Brookfield Viscosity | |
|---|---|
| 1 RPM (rotations per minute) | 92,000 eps. |
| 10 RPM | 19,400 cps. |
| 100 RPM | 3,648 cps. |
| Krebs Stormer Viscosity | 109 KU |
| ICI Cone and Plate Viscosity | 0.9 |
| Leneta Chart | |
| Sag Reading | 10 |
| Leveling Reading | 4 |
| pH | 8.61 |
| Temp. °C | 23.5 |
| Pounds/Gallons | 11.95 weight/gallon |
| Syneresis Settling Rating | |
| 120/10D % | 1.65 |
| Scrub Rating | 101/136 |
| | 101/152 |
| Brush Drag Rating | 3 |
| Brush Out Rating | OK Loading |
| | Poor Leveling |
| Roller Splatter Rating | 8 |
| Spray Out Rating | Good Atomization at 18 mils. |
| Roll Out Rating | 5 Splatter |
| | Coarse Texture |

12

D. An aqueous slurry of non-exchanged montmorillonite added to paint at a rate of 6 dry lbs/100 gallons paint was found to have the following characteristics:

| Brookfield Viscosity | |
|---|---|
| 1 RPM (rotations per minute) | 104,000 cps. |
| 10 RPM | 28,400 cps. |
| 100 RPM | 4.470 cps. |
| Krebs Stormer Viscosity | 115 KU |
| ICI Cone and Plate Viscosity | 0.9 |
| Leneta Chart | |
| Sag Reading | 14 |
| Leveling Reading | 1–2 |
| pH | 8.17 |
| Temp. °C. | 22.6 |
| Pounds/Gallons | 11.77 weight/gallon |
| Syneresis Settling Rating | |
| 120/10D % | 1.85 |
| Scrub Rating | 166/200 |
| | 137/216 |
| Brush Drag Rating | 2.5 |
| Brush Out Rating | Good Loading |
| Roller Splatter Rating | 7-8 |
| Spray Out Rating | Good Atomization at 16 mils. |
| Roll Out Rating | 4 Splatter |
| | Fine Texture |

E. An aqueous slurry of montmorillonite exchanged with the quat ACAR 94005 (prepared as in Example 1, at 30 milliequivalence/100 grams montmorillonite) added to the same paint as D at 7 dry lbs/100 gallons paint was found to have the following characteristics:

| Brookfield Viscosity | |
|---|---|
| 1 RPM (rotations per minute) | 81,600 cps. |
| 10 RPM | 16,360 cps. |
| 100 RPM | 2,840 cps. |
| Krebs Stormer Viscosity | 101 KU |
| ICI Cone and Plate Viscosity | 0.8 |
| Leneta Chart | |
| Sag Reading | 8–9 |
| Leveling Reading | 3 |
| pH | 8.24 |
| Temp. °C | 22.6 |
| Pounds/Gallons | 11.95 weight/gallon |
| Syneresis Settling Rating | |
| 120/10D % | 1.79 |
| Scrub Rating | 154/183 |
| | 122/159 |
| Brush Drag Rating | 2.5–3 |
| Brush Out Rating | Good Loading |
| Roller Splatter Rating | 8 |
| Spray Out Rating | Good Atomization at 17 mils. |
| Roll Out Rating | 2 Splatter |
| | Fine Texture |

F. An aqueous slurry of montmorillonite exchanged with the quat ACAR 94005 (prepared as in Example 1, at 30 milliequivalence/100 grams montmorillonite) added to the same paint as D at 8 dry lbs/100 gallons paint was found to have the following characteristics:

| Brookfield Viscosity | |
|---|---|
| 1 RPM (rotations per minute) | 127,000 cps. |
| 10 RPM | 34,260 cps. |
| 100 RPM | 6,280 cps. |

| | |
|---|---|
| Krebs Stormer Viscosity | 132 KU |
| ICI Cone and Plate Viscosity | 1.1 |
| Leneta Chart | |
| Sag Reading | 16 |
| Leveling Reading | 1 |
| pH | 8.21 |
| Temp. °C | 22.8 |
| Pounds/Gallons | 11.84 weight/gallon |
| Syneresis Settling Rating | |
| 120/10D % | 1.32 |
| Scrub Rating | 137/154 |
| | 103/167 |
| Brush Drag Rating | 2.5–3 |
| Brush Out Rating | Good Loading |
| Roller Splatter Rating | 9 |
| Spray Out Rating | Good Atomization at 18 mils. |
| Roll Out Rating | 5 Splatter |
| | Fine Texture |

G. An aqueous slurry of montmorillonite exchanged with the quat ACAR 94006 (prepared as in Example 2 at 20 milliequivalence/100 grams montmorillonite) added to the paint at 6 dry lbs/100 gallons paint was found to have the following characteristics:

| | |
|---|---|
| Brookfield Viscosity | |
| 1 RPM (rotations per minute) | 130,000 cps. |
| 10 RPM | 27,000 cps. |
| 100 RPM | 4,640 cps. |
| Krebs Stormer Viscosity | 118 KU |
| ICI Cone and Plate Viscosity | 0.9 |
| Leneta Chart | |
| Sag Reading | 12–13 |
| Leveling Reading | 2 |
| pH | 8.18 |
| Temp. °C. | 22.7 |
| Pounds/Gallons | 11.90 weight/gallon |
| Syneresis Settling Rating | |
| 120/10D % | 1.67 |
| Scrub Rating | 165/197 |
| | 177/208 |
| Brush Drag Rating | 2.5–3 |
| Brush Out Rating | Good Loading |
| Roller Splatter Rating | 8-9 |
| Spray Out Rating | Good Atomization at 20 mils. |
| Roll Out Rating | 2 Splatter |
| | Medium Texture |

H. An aqueous slurry of montmorillonite exchanged with the quat ACAR 94006 (prepared as in Example 2 at 20 milliequivalence/100 grams montmorillonite) added to the paint at 6 dry lbs/100 gallons paint was found to have the following characteristics:

| | |
|---|---|
| Brookfield Viscosity | |
| 1 RPM (rotations per minute) | 81,000 cps. |
| 10 RPM | 23,100 cps. |
| 100 RPM | 4,290 cps. |
| Krebs Stormer Viscosity | 114 KU |
| ICI Cone and Plate Viscosity | 0.9 |
| Leneta Chart | |
| Sag Reading | 12 |
| Leveling Reading | 2-3 |
| pH | 8.30 |
| Temp. °C. | 22.6 |
| Pounds/Gallons | 11.88 weight/gallon |
| Syneresis Settling Rating | |
| 120/10D % | 1.72 |
| Scrub Rating | 182/236 |
| | 170/220 |
| Brush Drag Rating | 3 |
| Brush Out Rating | OK Loading |
| Roller Splatter Rating | 7–8 |
| Spray Out Rating | Good Atomization at 25–30 mils. |
| Roll Out Rating | 3 Splatter |
| | Medium Texture |

I. An aqueous slurry of montmorillonite exchanged with the quat ACAR 94006 (prepared as in Example 2 at 20 milliequivalence/100 grams montmorillonite) added to the paint at 7 dry lbs/100 gallons paint was found to have the following characteristics:

| | |
|---|---|
| Brookfield Viscosity | |
| 1 RPM (rotations per minute) | 121,000 cps. |
| 10 RPM | 37,400 cps. |
| 100 RPM | 6,900 cps. |
| Krebs Stormer Viscosity | 136 KU |
| ICI Cone and Plate Viscosity | 1.1 |
| Leneta Chart | |
| Sag Reading | 18 |
| Leveling Reading | 1 |
| pH | 8.23 |
| Temp. °C. | 22.5 |
| Pounds/Gallons | 11.81 weight/gallon |
| Syneresis Settling Rating | |
| 120/10D % | 1.61 |
| Scrub Rating | 145/196 |
| | 157/196 |
| Brush Drag Rating | 3.5 |
| Brush Out Rating | Ex. Loading |
| Roller Splatter Rating | 8–9 |
| Spray Out Rating | Good Atomization at 18 mils. |
| Roll Out Rating | 5 Splatter |
| | Medium Texture |

J. An aqueous slurry of montmorillonite exchanged with the quat ACAR 94005 (prepared as in Example 1 at 30 milliequivalence/100 grams montmorillonite) added to the paint at 7 dry lbs/100 gallons paint was found to have the following characteristics:

| | |
|---|---|
| Brookfield Viscosity | |
| 1 RPM (rotations per minute) | 86,800 cps. |
| 10 RPM | 17,880 cps. |
| 100 RPM | 3,192 cps. |
| Krebs Stormer Viscosity | 100 KU |
| ICI Cone and Plate Viscosity | 0.8 |
| Leneta Chart | |
| Sag Reading | 10 |
| Leveling Reading | 3 |
| pH | 8.18 |
| Temp. °C. | 23.0 |
| Pounds/Gallons | 11.90 weight/gallon |
| Syneresis Settling Rating | |
| 120/10 D % | 1.61 |
| Scrub Rating | 145/190 |
| | 163/194 |
| Brush Drag Rating | 2 |
| Brush Out Rating | OK Loading |

| | Easy |
|---|---|
| Roller Splatter Rating | 9 |
| Spray Out Rating | Good Atomization at 16 mils. |
| Roll Out Rating | 5 Splatter |
| | Rough Texture |

K. An aqueous slurry of montmorillonite exchanged with the quat ACAR 94006 (prepared as in Example 2 at 20 milliequivalence/100 grams montmorillonite) added to the paint at 5 dry lbs/100 gallons paint was found to have the following characteristics:

| Brookfield Viscosity | |
|---|---|
| 1 RPM (rotations per minute) | 76,000 cps. |
| 10 RPM | 15,520 cps. |
| 100 RPM | 2,680 cps. |
| Krebs Stormer Viscosity | 95 KU |
| ICI Cone and Plate Viscosity | 0.8 |
| Leneta Chart | |
| Sag Reading | 10 |
| Leveling Reading | 4 |
| pH | 8.32 |
| Temp. °C. | 22.7 |
| Pounds/Gallons | 11.89 weight/gallon |
| Syneresis Settling Rating | |
| 120/10D % | 2.42 |
| Scrub Rating | 131/197 |
| | 160/200 |
| Brush Drag Rating | 2 |
| Brush Out Rating | Ex. Loading |
| | Easy |
| Roller Splatter Rating | 8 |
| Spray Out Rating | Good Atomization at 19 mils. |
| Roll Out Rating | 2 Splatter |
| | Medium Splatter |

L. Benjamin Moore Contractor Flat Enhance Vinyl Latex paint was found to have the following characteristics:

| Brookfield Viscosity | |
|---|---|
| 1 RPM (rotations per minute) | 22,000 cps. |
| 10 RPM | 6,960 cps. |
| 100 RPM | 2,548 cps. |
| Krebs Stormer Viscosity | 102 KU |
| ICI Cone and Plate Viscosity | 1.1 |
| Leneta Chart | |
| Sag Reading | 8 |
| Leveling Reading | 5 |
| pH | 8.50 |
| Temp. °C. | 23.6 |
| Pounds/Gallons | 12.14 weight/gallon |
| Syneresis Settling Rating | |
| 120/10D % | <1 |
| Scrub Rating | 30/70 |
| | 30/70 |
| Brush Drag Rating | 4 |
| Brush Out Rating | Good Loading |
| | Leveling OK |
| Roller Splatter Rating | 9 |
| Spray Out Rating | Fair Atomization at 12 mils. |
| Roll Out Rating | 5 Splatter |
| | Leveling OK |

M. Benjamin Moore Regal Wall Satin paint was found to have the following characteristics:

| Brookfield Viscosity | |
|---|---|
| 1 RPM (rotations per minute) | 20,800 cps. |
| 10 RPM | 4,500 cps. |
| 100 RPM | 1,420 cps. |
| Krebs Stormer Viscosity | 87 KU |
| ICI Cone and Plate Viscosity | 1.4 |
| Leneta Chart | |
| Sag Reading | 15 |
| Leveling Reading | 7 |
| pH | 7.54 |
| Temp. °C. | 23.3 |
| Pounds/Gallons | 10.82 weight/gallon |
| Syneresis Settling Rating | |
| 120/10D % | <1 |
| Scrub Rating | 130/180 |
| | 130/180 |
| Brush Drag Rating | 2 |
| Brush Out Rating | Good Loading |
| | Leveling OK |
| Roller Splatter Rating | 7 |
| Spray Out Rating | Fair Atomization at 12 mils. |
| Roll Out Rating | 5 Splatter |
| | Leveling OK |

N. Benjamin Moore Contractor Flat with added paint was found to have the following characteristics:

| Krebs Stormer Viscosity | 97 KU |
|---|---|
| ICI Cone and Plate Viscosity | 1.5 |
| Leneta Chart | 10 |
| Sag Reading | |

Slight color change when comparing sealed leneta chart drawdown versus unsealed leneta chart drawdown.

O. Benjamin Moore paint with added tint was found to have the following characteristics:

| Krebs Stormer Viscosity | 100 KU |
|---|---|
| ICI Cone and Plate Viscosity | 1.5 |
| Leneta Chart | 18 |
| Sag Reading | |

Slight color change when comparing sealed leneta chart drawdown versus unsealed leneta chart drawdown.

P. Product of Example 2 with commercial antisplattering Associative Thickener (Rohm & Haas) agent added.

| ICI Cone and Plate Viscosity | 1.2 |
|---|---|
| Roller Splatter Rating | 8 |

TEST METHODS

Sag and leveling were conducted on Leneta antisag bar and leneta leveling bar on leneta form 7B.

What is claimed is:

1. An organoclay composition comprising the reaction product of a smectite-type clay having an ion exchange capacity of at least 50 meq. wt. per 100 g. clay (active basis), and an alkoxylated quaternary ammonium compound having the following formula:

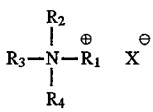

wherein $R_1$ and $R_2$ are alike or different, and are selected from the group consisting of $C_1$-$C_8$ alkyl, benzyl or 2-hydroxyethyl groups; $R_3$ is a $C_1$-$C_8$ alkyl, benzyl or 2-hydroxyethyl group, or an alkoxylated chain containing 0–10 moles ethylene oxide and 3–15 moles of an alkylene oxide residue selected from the group consisting of propylene oxide, butylene oxide and mixtures thereof; and $R_4$ is an alkoxylated chain containing 0–10 moles ethylene oxide and 3–15 moles of an alkylene oxide residue selected from the group consisting of propylene oxide, butylene oxide and mixtures thereof; and X is the salt anion.

2. The composition according to claim 1 wherein the alkoxylated quaternary ammonium compound of formula I has the formula wherein $R_3$ and $R_4$ are each independently an alkoxylated chain containing 1–5 moles ethylene oxide and 4–10 moles of an alkylene oxide residue selected from the group consisting of propylene oxide, and/or butylene oxide and mixtures thereof.

3. The composition according to claim 2 wherein the alkoxylated quaternary ammonium compound of formula I has the formula wherein $R_3$ and $R_4$ each contain the residue of 5 moles ethylene oxide and 5 moles propylene oxide.

4. The composition according to claim 2 wherein the alkoxylated quaternary ammonium compound of formula I has the formula wherein $R_3$ and $R_4$ each contain the residue of 1 mole of ethylene oxide and 4 moles of propylene oxide.

5. The composition according to claim 2 wherein the alkoxylated quaternary ammonium compound of formula I has the formula wherein $R_3$ and $R_4$ each contain the residue of 1 mole ethylene oxide and 5 moles each of propylene oxide and butylene oxide.

6. The composition according to claim 1 wherein the alkoxylated quaternary ammonium compound of the formula I has the formula wherein $R_1$, $R_2$, and $R_3$ are each a methyl group and $R_4$ is an alkoxylated chain.

7. The composition according to claim 6 wherein the alkoxylated quaternary ammonium compound of formula I has the formula wherein $R_4$ is an alkoxylated chain containing 1 mole ethylene oxide and 9 moles propylene oxide.

8. The composition according to claim 6 wherein the alkoxylated quaternary ammonium compound of formula I has the formula wherein $R_4$ is an alkoxylated chain containing 1 mole ethylene oxide, 5 moles propylene oxide, and 5 moles butylene oxide.

9. A process for the preparation of an organoclay composition comprising the reaction product of a smectite-type clay having an ion exchange capacity of at least 50 meq. wt. per 100 g. clay (active basis), and an alkoxylated quaternary ammonium compound having the following formula:

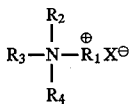

wherein $R_1$ and $R_2$ are alike or different, and are selected from the group consisting of $C_1$-$C_8$ alkyl, benzyl or 2-hydroxyethyl groups; $R_3$ is a $C_1$-$C_8$ alkyl, benzyl or 2-hydroxyethyl group, or an alkoxylated chain containing 0–10 moles ethylene oxide and 3–15 moles of an alkylene oxide residue selected from the group consisting of propylene oxide, butylene oxide and mixtures thereof; and $R_4$ is an alkoxylated chain containing 0–10 moles ethylene oxide and 3–15 moles of an alkylene oxide residue selected from the group consisting of the propylene oxide, butylene oxide and mixtures thereof; and X is the salt anion, which comprises:

a) dispersing a smectite-type clay having an ion exchange capacity of at least 50 meq. wt. per 100 g. clay, in an aqueous media;

b) heating the dispersion of step (a) to a temperature in excess of 30° C.;

c) adding to the heated dispersion of step (b) of a quaternary ammonium salt

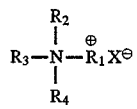

wherein $R_1$ and $R_2$ are alike or different, and are selected from the group consisting of $C_1C_8$ alkyl, benzyl or 2-hydroxyethyl groups; $R_3$ is a $C_1$-$C_8$ alkyl, benzyl or 2-hydroxyethyl group, or an alkoxylated chain containing 0–10 moles ethylene oxide and 3–15 moles of an alkylene oxide residue selected from the group consisting of propylene oxide, butylene oxide and mixtures thereof; and $R_4$ is an alkoxylated chain containing 0–10 moles ethylene oxide and 3–15 moles of an alkylene oxide residue selected from the group consisting of propylene oxide, butylene oxide and mixtures thereof; and X is the salt anion, in the desired milliequivalent ratio; and d) agitating oft he mixture of step (c) to effect completion of the reaction.

10. The process according to claim 9 wherein the alkoxylated quaternary ammonium compound of formula I has the formula wherein the $R_3$ and $R_4$ substituents are each independently an alkoxylated chain containing 1–5 moles ethylene oxide and 4–10 moles of an alkylene oxide residue selected from the groups consisting of propylene oxide, butylene oxide, and mixtures thereof.

11. The process according to claim 10 wherein the alkoxylated quaternary ammonium compound of formula I has the formula wherein $R_3$ and $R_4$ each contain the residue of 5 moles ethylene oxide and 5 moles propylene oxide.

12. The process according to claim 10 wherein the alkoxylated quaternary ammonium compound of formula I has the formula wherein $R_3$ and $R_4$ each contain the residue of 1 mole of ethylene oxide and 4 moles of propylene oxide.

13. The process according to claim 10 wherein the alkoxylated quaternary ammonium compound of formula I has the formula wherein $R_3$ and $R_4$ each contain the residue of 1 mole ethylene oxide and 5 moles each of propylene oxide and butylene oxide.

14. The process according to claim 9 wherein the alkoxylated quaternary ammonium compound of formula I has the formula wherein $R_1$, $R_2$ and $R_8$ are each a methyl group and $R_4$ is an alkoxylated chain.

15. The process according to claim 14 wherein the alkoxylated quaternary ammonium compound of formula I has the formula wherein $R_4$ is an alkoxylated chain containing 1 mole ethylene oxide and 9 moles propylene oxide.

16. The process according to claim 14 wherein the alkoxylated quaternary ammonium compound of formula I has the formula wherein $R_4$ is an alkoxylated chain containing 1 mole ethylene oxide, 5 moles propylene oxide, and 5 moles butylene oxide.

* * * * *